United States Patent [19]

Sasaki et al.

[11] Patent Number: 5,096,976

[45] Date of Patent: * Mar. 17, 1992

[54] METHACRYLIMIDE-CONTAINING POLYMER

[75] Inventors: Isao Sasaki, Otake; Kozi Nishida, Toyama; Hisao Anzai, Otake, all of Japan

[73] Assignee: Mitsubishi Rayon Company Ltd., Tokyo, Japan

[*] Notice: The portion of the term of this patent subsequent to Sep. 4, 2007 has been disclaimed.

[21] Appl. No.: 458,072

[22] Filed: Dec. 28, 1989

[30] Foreign Application Priority Data

Dec. 29, 1988 [JP] Japan ................... 63-334723

[51] Int. Cl.⁵ ............................................. C08F 8/32
[52] U.S. Cl. ............................. 525/330.5; 525/378; 525/379; 525/382
[58] Field of Search ............................. 525/330.5

[56] References Cited

U.S. PATENT DOCUMENTS

| | | |
|---|---|---|
| 2,146,209 | 2/1939 | De Witt et al. . |
| 3,284,425 | 11/1966 | Schroder et al. . |
| 4,246,374 | 1/1981 | Kopchik . |
| 4,727,117 | 2/1988 | Hallden-Abberton et al. . |
| 4,745,159 | 5/1988 | Anzai et al. . |
| 4,954,575 | 9/1990 | Sasaki et al. .................. 525/379 |

*Primary Examiner*—Bernard Lipman
*Attorney, Agent, or Firm*—Oblon, Spivak, McClelland, Maier & Neustadt

[57] ABSTRACT

Disclosed is a thermoplastic methacrylimide-containing polymer comprising 2 to 100% by weight of structural units represented by the following formula (I):

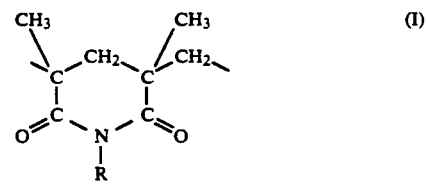

wherein R is hydrogen or a hydrocarbon group having 1 to 20 carbon atoms, and 0 to 98% by weight of structural units derived from an ethylenically unsaturated monomer, wherein the number of fine particles having a size of 0.5 to 25 μm as measured by a particle counter in the polymer is not more than 50,000 per gram of the polymer.

5 Claims, No Drawings

METHACRYLIMIDE-CONTAINING POLYMER

BACKGROUND OF THE INVENTION

1. Field of the Invention

The present invention relates to a high-purity methacrylimide-containing polymer having excellent transparency and heat resistance.

2. Description of the Related Art

A methyl methacrylate polymer has not only an excellent transparency but also excellent mechanical properties and weatherability, and therefore, this polymer has been used as a high-performance plastic optical material or decorative material. Recently, the development of uses of this polymer in the fields of short-distance communication and optical sensors has been investigated.

Nevertheless, since the heat distortion temperature of the methyl methacrylate polymer is about 100° C. and the heat resistance is too low, use of this polymer is considerably restricted in some fields where a heat resistance is required, and therefore, there is an urgent need for an improvement of the heat resistance of this polymer.

Imidization of a methyl methacrylate polymer is known as the means for improving the heat resistance of the methyl methacrylate polymer. For example, there have been proposed (1) a process in which a polymer of acrylic acid, methacrylic acid or an ester thereof is reacted under heating with a primary amine, ammonia or a compound capable of generating a primary amine or ammonia in the presence of a solvent (U.S. Pat. No. 2,146,209, German Patent No. 1,077,872 and German Patent No. 1,242,369), (2) a process in which a methyl methacrylate polymer is reacted with a primary amine in the presence of water (U.S. Pat. No. 3,284,425), and (3) a process in which an acrylic polymer is reacted with ammonia or a primary amine in an extruder (U.S. Pat. No. 4,246,374).

In the process (1), since the boiling point of the used solvent is high, it is difficult to completely separate the solvent from the imidized polymer on a commercial scale, and therefore, the obtained imidized polymer is colored and the transparency of the formed polymer is poor. In the process (2), since the reaction is carried out in the presence of water, when a partially imidized polymer is required, hydrolysis of the methyl methacrylate segments occurs, and therefore, it is difficult to obtain an imidized polymer having a desired heat resistance, and to obtain a uniform imidization. Furthermore, in the process (3), since the imidization reaction occurs between a polymer having a high viscosity and a gaseous imidizing substance, it is difficult to obtain a uniform imidization reaction, and therefore, it is difficult to obtain a uniformly partially imidized polymer.

Accordingly, the imidized polymers obtained according to the above-mentioned processes have an improved heat resistance, but if it is intended to prepare the polymers on a commercial scale, the transparency is poor or the imidization reaction becomes uneven, and therefore, these processes are not practically usable.

SUMMARY OF THE INVENTION

A primary object of the present invention is to overcome the above-mentioned defects of the conventional techniques and provide a high-purity methacrylimide-containing polymer having an excellent transparency and heat resistance while retaining the characteristic properties inherent to a methacrylic acid ester polymer, such as excellent optical characteristics, mechanical characteristics, weatherability, and molding processability.

In accordance with the present invention, there is provided a methacrylimide-containing polymer, which is a thermoplastic polymer comprising 2 to 100% by weight of structural units represented by the following formula (I):

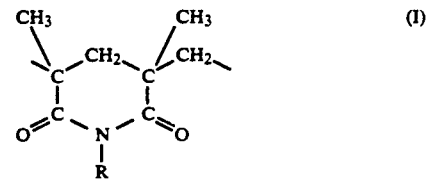

wherein R represents a hydrogen atom or an aliphatic, aromatic or alicyclic hydrocarbon group having 1 to 20 carbon atoms, and 0 to 98% by weight of structural units derived from an ethylenically unsaturated monomer, wherein the number of fine particles having a size of 0.5 to 25 μm in the polymer as measured by a particle counter is not more than 50,000 per gram of the polymer.

DESCRIPTION OF THE PREFERRED EMBODIMENTS

The high-purity methacrylimide-containing polymer of the present invention can be continuously prepared according to the present invention in an industrially advantageous manner.

In the continuous preparation of the methacrylimide-containing polymer, an inert gas is introduced into a solution comprising 10 to 60% by weight of an inert solvent, 90 to 40% by weight of a mixture of a methacrylic acid ester or methacrylic acid ester and an ethylenically unsaturated monomer copolymerizable therewith, 0.0001 to 0.5% by weight of a radical initiator and 0 to 5% by weight of a molecular weight modifier to maintain the amount of dissolved oxygen below 1 ppm, the solution is filtered through a filter having a pore size smaller than 1 μm, the substantially homogeneously mixed solution is continuously introduced into a first reaction zone, at least 80% by weight of the initial monomer is converted to a polymer at a temperature of 80° to 170° C. in a second reaction zone having a plug flow, the polymerization reaction liquid and an imidizing substance represented by the following general formula (II):

wherein R represents a hydrogen atom or an aliphatic aromatic or alicyclic hydrocarbon group having 1 to 20 carbon atoms, which has been filtered through a filter having a pore size smaller than 1 μm, are subjected to an imidization reaction at a temperature of 150° to 350° C. in a third multi-stage reaction zone including at least two reaction zones, the reaction liquid finally heated at 150° to 350° C. is introduced into a final zone where the pressure is maintained below atmospheric pressure, the volatile components are separated and removed by flash distillation, and the polymer obtained by the flash distillation is continuously received by an extruder screw and is shaped by the extruder.

The polymer of the present invention and the preparation process thereof will now be described in detail.

The methacrylimide-containing polymer of the present invention is an imidization product of a polymer of a methacrylic acid ester. The methacrylic acid ester to be imidized is a homopolymer of a methacrylic acid ester or a copolymer of a methacrylic acid ester with a copolymerizable ethylenically unsaturated monomer. Preferably, the homopolymer or copolymer of a methacrylic acid ester has an intrinsic viscosity of 0.01 to 3.0. The methacrylimide-containing polymer preferably has a molecular weight (Mw) as measured by gel permeation chromatography (GPC) of 50,000 to 200,000.

As the methacrylic acid ester constituting the homopolymer and copolymer, there can be mentioned, for example, methyl methacrylate, ethyl methacrylate, propyl methacrylate, n-butyl methacrylate, isobutyl methacrylate, tert.-butyl methacrylate, cyclohexyl methacrylate, norbonyl methacrylate, 2-ethylcyclohexyl methacrylate, and benzyl methacrylate. As the acrylic acid ester, there can be used methyl acrylate, ethyl acrylate, propyl acrylate, n-butyl acrylate, isobutyl acrylate, tert.-butyl acrylate, cyclohexyl acrylate, norbonyl acrylate, 2-ethylhexyl acrylate, and benzyl acrylate. As the copolymerizable ethylenically unsaturated monomer, there can be used methacrylic acid esters other than the used methacrylic acid ester, acrylic acid esters, acrylic acid, methacrylic acid, styrene and substituted styrenes such as 2-methylstyrene. These monomers can be used alone or in the form of a mixture of two or more thereof.

Of these methacrylic acid ester polymers, a methyl methacrylate homopolymer or a copolymer of at least 25% by weight of methyl methacrylate with up to 75% by weight of a copolymerizable ethylenically unsaturated monomer is preferably used. From the viewpoint of the transparency, a homopolymer of methyl methacrylate is most preferably used.

The polymerization reaction and imidization reaction are carried out in the presence of a solvent. The inert solvent used must not inhibit the advance of the polymerization reaction or imidization reaction and must not substantially react with the reaction mixture. For the partial imidization reaction, the solvent must not cause any substantial change of segments of the methyl methacrylate. Furthermore, the solvent must be easily separated and removed from the formed imidized polymer.

A mixed solvent of a poor solvent having a boiling point of 50° to 150° C. under atmospheric pressure, which cannot substantially dissolve the methacrylic resin at normal temperature, and a good solvent capable of easily dissolving the methacrylic resin, are preferably used as the solvent. Especially preferably, a solvent having a solubility parameter $\delta$ of 14.0 to 19.5 $(cal/cm^3)^{\frac{1}{2}}$ is used as the poor solvent and a solvent having a solubility $\delta$ of 8.0 to 13.9 $(cal/cm^3)^{\frac{1}{2}}$ is used as the good solvent. As an example of the poor solvent, methanol can be mentioned. As examples of the good solvent, there can be mentioned alcohols such as pentanol, hexanol, 2-methylpentanol, 4-methyl-2-pentanol, 2-ethyl-1-butanol, 1-pentanol and octanol; aromatic hydrocarbon compounds such as benzene, toluene, xylene, ethylbenzene, cumene, mesitylene, naphthalene, tetralin, butylbenzene, diethylbenzene, pentylbenzene and biphenyl; and ketone and ether compounds such as phorone, isophorone, cyclohexanone, acetophenone, dibutyl ether, dihexyl ether, anisole, phenetole, dibutyl phenyl ether, diphenyl ether, diglyme and diethylene glycol diethyl ether. Of these good solvents, toluene, benzene, xylene, and ethylbenzene are preferably used.

The solubility parameter $\delta$ referred to in the present invention is based on the standard described in the Polymer Handbook, Second Edition, J. Brandrup, E. H. Immergut, John Wiley & Sons, New York).

In the mixed solvent used in the preferable preparation process, if the boiling points of the poor solvent and good solvent are higher than 150° C. under atmospheric pressure, it is difficult to sufficiently remove the volatile substance composed mainly of the solvents from the reaction product obtained by the imidization reaction. If the boiling points are lower than 50° C., it is impossible to elevate the imidization reaction temperature because the inner pressure of the reaction system is increased by an elevation of the temperature, and therefore, the imidization reaction cannot be satisfactorily performed. Furthermore, when volatile substances are separated and removed from the reaction product, and abrupt evaporation occurs and a control of the separating operation is difficult. If the solubility parameters $\delta$ of the combined poor and good solvents are outside the above-mentioned ranges, it is difficult to obtain a uniform polymerization reaction and imidization reaction, and it is difficult to obtain a methacrylimide-containing polymer having a high quality.

The solvent is used in an amount of 10 to 60% by weight based on the sum of the solvent and monomer. If the amount of the solvent is smaller than 10% by weight, the viscosity of the reaction mixture is too high, and the handling becomes difficult, and since the polymerization reaction or imidization reaction does not progress uniformly, the quality of the obtained polymer is poor. If the amount of the solvent used is larger than 60% by weight, separation of the solvent from the polymer becomes difficult and the amount of polymer obtained is small, and thus the process is industrially disadvantageous. Preferably, the solvent is used in an amount of 20 to 50% by weight.

When the mixed solvent is used, the poor solvent/good solvent weight ratio is from 99/1 to 1/99, preferably, from 90/10 to 10/90.

The inert solvent used diffuses the imidizing substance easily in the methacrylic polymer and causes the imidization reaction to progress uniformly and prominently while effectively controlling and removing heat generated by the reaction, and therefore, a transparent methacrylimide-containing polymer having an excellent heat resistance, which is a desirably optical material, can be obtained.

The radical polymerization initiator used as the polymerization is actively decomposed at the reaction temperature to generate a radical. For example, there can be mentioned organic peroxides such as di-tert-butyl peroxide, dicumyl peroxide, methyl ethylketone peroxide, di-tert.-butyl perphthalate, di-tert.-butyl perbenzoate, tert.-butyl peracetate, 2,5-dimethyl-2,5-di(tert.-butulperoxy)hexane, di-tert.-amyl peroxide, 2,5-dimethyl-2,5-di(tert.-butylperoxy)hexane, benzoyl peroxide and lauryl peroxide, and azo compounds such as azobisisobutanol diacetate, 1,1-azobiscyclohexanecarbonitrile, 2-phenylazo-2,4-dimethyl-4-methoxyvaleronitrile, 2-cyano-2-propyazoformamide, and 2,2-azobisisobutyronitrile. These radical polymerization initiators can be used alone or in the form of a mixture of two or more thereof. The amount of the radical polymerization initiator used is within the range of 0.0001 to 0.5% by weight based on the solution containing the monomer. Customarily used mercaptans and the like can be used as the molecular weight modifier. As specific examples of the mercaptan, there can be mentioned primary, secondary and tertiary mercaptans having an alkyl group or a substituted alkyl group, such as n-butylmercaptan, isobutylmercaptan, n-octylmercaptan, n-dodecylmercaptan, sec.-butylmercaptan, sec.-dodecylmercaptan, and tert.-butylmercaptan, aromatic mercaptans such as phenylmercaptan, thiocresol, and 4-tert.-butyl-o-thiocresol, thioglycolic acid and esters thereof, and mercaptans having 3 to 18 carbon atoms, such as ethylene glycol mercaptan. As the non-mercaptan molecular weight modifier, there can be used at least one member selected from the group consisting of $\beta$-terpinolene, terpinol, and alkyl-substituted-1,4-cyclohexadienes. As the alkyl-substituted-cyclohexadiene, there can be mentioned $\gamma$-terpinene, 2-metyl-1,4-cyclohexadiene, 2,6-dimethylcyclohexadiene, 2,5-dimethylcyclohexadiene, 2-isopropyl-1,4-cyclohexadiene, and 2-ethyl-1,4-cyclohexadiene. Substantially, the amount of the molecular weight modifier used is up to 5% by weight.

Then an inert gas is introduced into the so-prepared monomer solution to reduce the amount of oxygen dissolved in the solution to less than 1 ppm. If the amount of dissolved oxygen is larger than 1 ppm, the yellowness of the obtained methacrylimide-containing polymer is increased. The method of reducing the amount of oxygen dissolved in the monomer solution to less than 1 ppm is not particularly critical, but preferably a method is adopted in which the monomer solution is continuously supplied to a counter-current contact column where the solution is brought into counter-current contact with an inert gas such as nitrogen gas, to expel dissolved oxygen into the inert gas by utilizing the gas-liquid equilibrium. In the inert gas bubbling method customarily and simply conducted in a feed tank, the reduction limit of the amount of dissolved oxygen is 10 to 20 ppm, and it is difficult to reduce the amount of dissolved oxygen to less than 1 ppm. Accordingly, this method is not preferable.

In the present invention, after the amount of dissolved oxygen has been thus reduced to less than 1 ppm, the monomer solution must be filtered through a filter having a pore size not larger than 1 $\mu$m; for example, Fluoropore supplied by Sumitomo Electric Industries is preferably used as the filter.

In the polymer finally obtained from the monomer solution obtained by this filtering treatment, the number of fine particles having a size of 0.5 to 25 $\mu$m as measured by a particulate counter is not more than 50,000 per gram of the polymer.

Then the monomer solution which has been subjected to the filtering treatment and fine particle-removing treatment is introduced into a first reaction zone in which the monomer solution is substantially homogeneously mixed, and at least 40% by weight of the monomer is converted to a polymer at a temperature of 60° to 190° C. If the polymerization temperature in the first reaction zone is lower than 60° C., the viscosity of the polymer becomes high and it is difficult to obtain a homogeneous mixture. If the polymerization temperature is higher than 190° C., the formation of reaction by-products becomes conspicuous. Accordingly, the polymerization temperature in the first reaction zone is 60° to 190° C. and preferably 70° to 180° C.

It has been found that if the conversion of the monomer to the polymer in the first reaction zone is lower than 40% by weight, the thermal decomposition resistance of the finally obtained methacrylimide-containing polymer is lowered. The cause of this phenomenon has not been elucidated, but it is assumed that this phenomenon is probably due to a change of the terminal structure of the polymer molecule, which is related to the reaction mechanism for stopping the polymerization. If the thermal decomposition resistance of the polymer is lowered, a defect called "silver streak" appears due to the decomposition product, during the molding processing, and thus the appearance and physical properties are poor. Accordingly, the conversion of the monomer to the polymer in the first reaction zone is at least 40% by weight, preferably at least 60% by weight. If a substantially homogeneous mixture is not obtained in the first reaction zone, and a portion having a polymerization conversion lower than 40% by weight is partially present, a polymer having a poor thermal decomposition resistance is partially formed. Accordingly, in the first reaction zone, a substantially homogeneous state must be maintained by a thorough mixing. This thorough mixing in the first reaction zone usually can be obtained by using a stirring mixing tank provided with an anchor, helical ribbon, screw or paddle type stirrer.

In the second reaction zone having a plug flow, the polymerization liquid from the first reaction zone is polymerized at a temperature of 80° to 170° C., to convert at least 80% by weight of the initial monomer to a polymer.

The imidizing substance of formula (II) used in the third reaction zone reacts partially with the monomer if any monomer remains, whereby an amide derivative as a high-boiling-point by-product is formed. If a large quantity of the monomer is not converted in the second reaction zone and is introduced into the third reaction zone, the formation of the amide derivative as the high-boiling-point by-product becomes conspicuous and a separation of this by-product from the polymer becomes difficult. If the amide derivative as the high-boiling-point by-product remains in the polymer, discoloration or a lowering of the quality of the polymer occurs. Accordingly, to control the formation of the amide derivative as the high-boiling-point by-product in the third reaction zone, the polymerization conversion of the initial monomer in the third reaction zone must be at least 80% by weight, preferably at least 90% by weight.

To attain a high polymerization conversion in the second reaction zone, a reaction apparatus having a plug flow must be provided, that is, a reaction apparatus having a relatively long shape, which is constructed so that the reaction mixture is supplied from one end and discharged from the other end, and mingling in the longitudinal direction of the reaction apparatus does not substantially occur. For example, there can be mentioned a screw extruder type reaction apparatus disclosed in U.S. Pat. No. 3,234,303, a columnar reaction apparatus disclosed in U.S. Pat. No. 3,252,950, a tubular reaction apparatus provided with a baffle plate, disclosed in British Patent No. 2,101,139, and a hollow tubular reaction apparatus.

The polymerization temperature in the second reaction zone is not higher than 170° C. For the above-mentioned reason, the polymerization conversion in the second reaction zone is adjusted to at least 80%. Nevertheless, the highest obtainable polymerization ratio is influenced by the equilibrium between the growth reaction of the active polymer and the reverse growth reaction at a given temperature, that is, by the polymerization temperature, and if the polymerization temperature is higher than 170° C., it is difficult to obtain a polymerization ratio of 80%. On the other hand, if the polymerization temperature is lower than 80° C., the rate of polymerization is reduced and the process becomes economically disadvantageous. Furthermore, the viscosity is increased, and thus delivery of the reaction liquid becomes difficult. Accordingly, the reaction temperature in the second reaction zone is 80° to 170° C., preferably 90° to 160° C. An imidizing substance of the formula (II) is added to the polymerization reaction liquid from the second reaction zone, and the reaction liquid is introduced into the third reaction zone. The imidizing substance used must be filtered through a filter having a pore size not larger than 1 μm, as well as the above-mentioned monomer solution. The imidizing substance can be used alone or when dissolved and diluted in a inert solvent as mentioned above. When the imidizing substance is diluted with an inert solvent, as in the case of the above-mentioned monomer solution, the concentration of dissolved oxygen must be made less than 1 ppm, and the dilution must be passed through a filter having a pore size smaller than 1 μm.

The reaction of the methacrylic polymer obtained in the second reaction zone with the imidizing substance is carried out in the third reaction zone. Preferably, the third reaction zone comprises at least two reaction zones; one of these reaction zones being a reaction zone in which the methacrylic polymer is reacted with the imidizing substance to cause a condensation reaction among polymeric side chains of the methacrylic polymer, and the other reaction zone is being an aging reaction zone in which the reaction product containing the imidized polymer is again heated to further promote the imidization reaction. The imidization of the methacrylic polymer is advanced by at least two steps in the reaction zone and the aging reaction zone. If necessary, a plurality of reaction zones and a plurality of aging reaction zones can be combined. The reaction between the methacrylic polymer and the imidizing substance in the reaction zone is carried out at a temperature of 150° to 350° C. If the reaction temperature is lower than 150° C., the rate of imidization reaction is low, and if the reaction temperature is higher than 350° C., the decomposition of the starting methacrylic polymer occurs concurrently. The reaction time in the reaction zone is not particularly critical, but a shorter reaction time is preferably from the viewpoint of productivity, and preferably the reaction time is 20 minutes to 5 hours. If the reaction is carried out in the continuous manner, the average residence time is about 20 minutes to about 5 hours.

If water is present in the reaction system during the imidization reaction, hydrolysis of the ester portion of the methacrylic resin with water occurs as a side reaction during the imidization and condensation, with the result that methacrylic acid is formed in the obtained methacrylimide-containing polymer and it is difficult to obtain an intended methacrylimide polymer having a desired degree of imidization. Therefore, this reaction is carried out in the state wherein the reaction does not substantially contain water more specifically, at a water content not larger than 1% by weight, preferably under an anhydrous condition.

To prevent discoloration of the obtained imidized polymer, preferably, the reaction is carried out in an inert gas atmosphere containing nitrogen, helium or argon gas.

As specific examples of the imidizing substance represented by formula (II), there can be mentioned aliphatic primary amines such as methylamine, ethylamine, and propylamine, compounds capable of forming an aliphatic primary amine under heating, such as 1,3-dimethylurea, 1,3-diethylurea, and 1,3-dipropylurea, and ammonia and urea. There also can be mentioned aromatic amines such as aniline, toluidine, and trichloroaniline, and alicylic amines such as cyclohexylamine and bornylamine.

In view of the heat resistance and transparency, methylamine, ammonia, and cyclohexylamine are preferably used as the imidizing substance.

The amount of the imidizing substance used is not simply defined but depends on the amount to be imidized. In general, however, the imidizing substance is used in an amount of 1 to 250 parts by weight per 100 parts by weight of the methacrylic ester polymer. If the amount of the imidizing agent is smaller than 1 part by weight, a substantial improvement of the heat resistance cannot be obtained, and if the amount of the imidizing substance is larger than 250 parts by weight, the process becomes economically disadvantageous.

The imidization reaction product withdrawn from the condensation reaction zone is supplied to the aging reaction zone, if necessary. In the aging reaction zone, the aging reaction is carried out at a temperature of 150° to 350° C., preferably 170° to 300° C., as in the case of the reaction at the preceding step.

To effectively carry out the aging reaction in the aging reaction zone, the aging reaction time should be at least 5 minutes, and if the aging reaction is carried out in the continuous manner, the average residence time should be at least 5 minutes. If the aging reaction time is shorter than 5 minutes, a substantial aging effect cannot be obtained. It is not clear what contribution is made to the product by the aging reaction per se, but if the aging reaction is not satisfactory, unreacted amide segments remain in the polymer product, and the heat resistance, the thermal decomposition resistance, and the yellowing after exposure to heat are poor.

Preferably, the amount of non-volatile amide segments in the polymer is not larger than 5% by weight based on the weight of the polymer.

As the reaction apparatus used in the reaction zone of the third reaction zone, there can be mentioned, for example, a stirring mixing tank type reaction apparatus as described above, a reaction apparatus comprising at least two reaction zones in one reactor, a screw extruder type reaction apparatus, a columnar reaction apparatus, and a tubular reaction apparatus. Among these apparatus, a stirring mixing tank type reaction apparatus is most preferable, as when the stirring mixing tank reaction apparatus is used, the polymer is uniformly imidized and a high-purity methacrylimide-containing polymer having an excellent transparency and heat resistance can be obtained.

From the viewpoint of the heat resistance, the degree of imidization of the methacrylic resin is such that the amount of the structural units represented by the general formula (I) is 2 to 100% by weight, preferably 30 to 100% by weight, more preferably 50 to 100% by weight.

The methacrylimide-containing polymer obtained by the imidization has an intrinsic viscosity of 0.02 to 4.5 (the measurement method will be described hereinafter).

After the termination of the imidization reaction, volatile components are separated from the reaction liquid to obtain an intended polymer. The volatile components can be efficiently separated by flashing the reaction product containing large quantities of the volatile components under atmospheric pressure or a larger pressure, preferably a reduced pressure, while maintaining a stable flow state. More specifically, the reaction mixture is heated at 170° to 300° C. and flashed into a tank maintained at atmospheric pressure or a lower pressure, through a narrow nozzle. The flashed polymer is received on an extruder screw and is recovered in the form of a strand from a die orifice through the extruder.

The volatile components left in the product can be efficiently removed by carrying out flashing into a reduced pressure atmosphere and deaeration in the extruder in combination. To prevent yellowing of a molded article of the obtained polymer, preferably the amount of the amide derivative as the volatile component in the polymer is not larger than 1000 ppm and the amount of the residual monomer is not larger than 500 ppm.

Additives such as an antioxidant, a plasticizer, a lubricant and an ultraviolet absorber can be added to the methacrylimide polymer of the present invention according to need.

The methacrylimide-containing polymer of the present invention has an excellent heat resistance and transparency; in particular, the content of fine particles is low (i.e., the number of fine particles having a size of 0.5 to 25 μm is not more than 50,000 per gram of the polymer) and preferably the yellowness index value as measured by a color difference meter is not larger than 3, and thus, the transparency is very high.

Accordingly, the methacrylimide-containing polymer of the present invention is widely used in fields where such characteristics are required, for example, for the production of optical fibers, optical disks, CRT filters, meters, display materials for digital display boards, illuminating optical articles, automobile head lamp light covers, lenses, electrical parts, and molding materials formed by blending with other resins. Therefore, the industrial significance and value of the present invention are very high.

The present invention will now be described in detail with reference to the following examples. In the examples, all of "parts" and "%" are by weight unless otherwise indicated.

In the examples, the characteristics of the polymers were determined by the following methods.

(1) IR Absorption Spectrum

The infrared absorption spectrum was measured by the KBr disk method using an infrared spectrophotometer (Model 285 supplied by Hitachi).

(2) Intrinsic Viscosity

The flow time (ts) of a dimethylformamide solution containing 0.5% by weight of the sample polymer and the flow time (to) of dimethylformamide were measured at 25°±0.1° C. by using a Deereax-Bischoff viscometer, and the relative viscosity ηrel of the polymer was determined from the value ts/to. Then the intrinsic viscosity was calculated from the following equation:

$$\text{Intrinsic viscosity} = \lim_{c \to 0} \ln(\eta rel)/c$$

wherein c represents the gram number of the polymer per 100 ml of the solvent.

(3) Heat Distortion Temperature

The heat distortion temperature was measured according to ASTM D-648.

(4) Total Luminous Transmittance

The total luminous transmittance (%) of the molded article was measured according to ASTM-D-1003. An injection-molded board having a size of 40 mm×40 mm×3 mm was used as the sample.

(5) Degree of Imidization

The nitrogen content in the polymer [N(%)] was determined by elementary analysis using a CHN coder (Model MT-3 supplied by Yanagimoto Seisakusho), and the degree of imidization was calculated from the determined nitrogen content. For example, the degree of imidization x was calculated as follows:

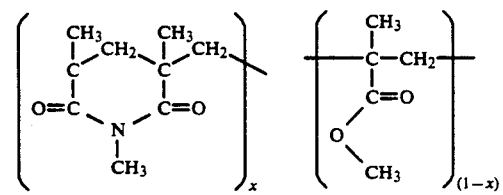

$$N(\%) = \frac{14x}{167x + (1-x)100} \times 100$$

(6) Fine Particle Content

The fine particle content was determined by weighing 5 g of the polymer, dissolving the polymer in 30 ml of dichloroethane, and measuring the number of particles having a size of 0.5 to 25 μm by a counter calibrated with respect to a scattering of laser beams by using HIAC-ROYCO.

(7) Attenuation in Light Transmittance

The obtained pelletized polymer was melt-shaped into a strand having a diameter of 1 mm, and the strand was coated with an outer layer having a low.

(8) Yellowness Index

The yellowness index (YI value) was determined by using a color analyzer (Model 307 supplied Hitachi) of a color difference meter according to JIS K-7103. An injection-molded plate having a size of 40 mm×40 mm×3 mm was used as the sample.

(9) Volatiles Content

The polymer was dissolved in dimethylformamide an the amount of volatile components (the amide derivative and the residual monomer) was determined by the gas chromatography.

(10) Amount of Amide Segments in Polymer

The amount of amide segments in the polymer was measured by using an FT-NMR spectrometer (JNM-GSK-400 supplied by Nippon Denshi) and TMS as the internal reference at 5% by weight of d6-dimethylsufoxide and 120° C. and was expressed in term of % by weight.

(11) Molecular Weight

Molecular weight measurement by GPC

The molecular weight of polymer is measured in accordance with descriptions in "Gel Chromatography (basic edition)", pp. 97–122, published from Kodansha, using Column HSG-20, 50 (manufactured by Shimazu Seisakusho, Co.). A calibration curve was prepared from a standard polystyrene (manufactured by Fresher Chemical Co.) and the specimen was leached out using tetrahydrofuran solution. The leaching curve obtained by using the specimen solution was equally divided and the height at each of the divisional points was measured to determine Mw by the following equation.

$$Mw = Qm \sum_i [Hi \times Mi(p)]/Qp \sum_i Hi$$

where

Hi: height of the leaching curve at the divisional point.

Mi(p): molecular weight of a standard polystyrene at divisional point i.

Qm, Qp: Q factor for the polymer and polystyrene, which are respectively assumed as 40 and 41.

EXAMPLE 1

A polymerization feed liquid comprising 65 parts of methyl methacrylate, 30 parts of toluene, 5 parts of methanol, 0.08 part of 1,1'-azobiscyclohexanecarbonitrile, 0.0325 part of 2,2-azobisisobutyronitrile and 0.3 part of terpinol was continuously supplied into a nitrogen-feed counter-current contact column (nitrogen/-feed liquid weight ratio of 1/100) to reduce the amount of dissolved oxygen to 0.6 ppm. Then, the starting feed liquid was passed through Fluoropore (supplied by Sumitomo Electric Industries) having a pore size of 0.1 μm, to reduce the number of particles having a size of 0.5 to 25 μm in the feed liquid to 100 per ml and obtain a high-purity feed liquid. The feed liquid was continuously fed at a rate of 4 l/hr into a first stirring tank type reaction apparatus having an inner volume of 20 liters. When the polymerization conversion was measured just after the reaction liquid came from the reaction apparatus, it was found that the conversion was 65%.

The polymerization liquid was introduced into a multi-tubular second reaction apparatus of the heat exchange type (constructed by 30 straight tubes having an inner diameter of 12.7 mm and a length of 1,000 mm), and a reaction was carried out at a temperature of 140° C. until the polymerization conversion was elevated to 95%. The polymerization liquid was mixed with an imidizing substance described below and introduced into a stirring tank type reaction apparatus in the third reaction zone.

Separately, a mixed solvent (toluene/methanol weight ratio = 1/1) for diluting the imidizing substance (methylamine) was treated in the same manner as the starting feed liquid, to reduce the dissolved oxygen concentration to 0.6 ppm, methylamine was then added at a concentration of 40% by weight, and the liquid was filtered through Fluoropore having a pore size of 0.1 μm, fed at a rate of 1.2 l/hr, mixed with the above-mentioned polymerization liquid, and supplied into the third reaction zone.

The liquid mixture of the polymerization liquid and the imidizing substance was supplied into the stirring tank type reaction apparatus having an inner volume of 15 l and maintained at 230° C. in the third reaction zone, to effect an imidization reaction. The reaction liquid from this reaction zone was supplied into a stirring tank type reaction apparatus having an inner volume of 3 liters and maintained at 230° C., and disposed above the reaction zone to act as an aging reaction zone. The reaction liquid from these reaction zones was flashed into a tank maintained at a reduced pressure of 100 Torr, from a nozzle orifice. The flashed polymer was supplied onto a screw having an L/D ratio of 20 and extruded in the form of a strand from a double-vented twin-screw extruder having a diameter of 30 mm, whereby the polymer was pelletized. In the double-vented extruder, the vent portion was maintained at a pressure of 5 mmHg and a temperature of 260° C.; the temperature of the metering portion was 260° C., and the temperature of the die portion was 255° C.

When the infrared absorption spectrum of the obtained pelletized polymer was measured, it was found that characteristic absorptions of methacrylimide were present at wave numbers of 1720 cm$^{-1}$, 1663 cm$^{-1}$ and 750 cm$^{-1}$, and it was confirmed that the obtained polymer was a methacrylimide-containing polymer. The physical properties of the obtained polymer were as follows.

Total luminous transmittance: 93%

Heat distortion temperature: 145° C.

Degree of imidization: 80%

Number of particles in polymer: 12,000 per gram of polymer

As apparent from the above data, a methacrylimide-containing polymer having an excellent heat resistance and transparency, particularly a polymer having a reduced number of fine particles and an excellent transparency, was obtained.

COMPARATIVE EXAMPLE 1

The same monomer composition as used in Example 1 was used without any change and the polymerization was carried out without filtration through the filter, and the obtained polymerization liquid was used as the starting material to be imidized. The physical properties of the obtained methacrylimide-containing polymer were as follows.

Total luminous transmittance: 89%

Heat distortion temperature: 145° C.

Degree of imidization: 80%

Number of particles in polymer: 60,000 per gram of polymer

As is apparent from the above data, the thus-obtained methacrylimide polymer had an excellent heat resistance but a scattering of dust was conspicuous in the polymer.

EXAMPLE 2

A monomer mixture comprising 100 parts of monomeric methyl methacrylate, 0.1 part of 1,1'-azobiscyclohexanecarbonitrile and 0.2 part of 2-octylmercaptan was subjected to the dissolved oxygen-removing treatment and filtered through Fluoropore having a pore size of 0.1 μm, and the mixture was heated at 100° C. for 17 hours to obtain a starting material (methacrylic resin). A 10-liter reaction vessel equipped with a paddle spiral stirrer, a pressure gauge, a sample injector, and a jacketed heater was charged with 100 parts of the methacrylic resin, 80 parts of toluene, which had been subjected to the dissolved oxygen-removing treatment and the filtering treatment with Fluoropore having a pore size of 0.1 μm and 20 parts of methanol, which had been similarly treated, and the inner atmosphere was replaced by nitrogen. Then, the temperature was elevated to 150° C. to dissolve the methacrylic resin, and a solution of 18.6 parts (molar ratio of 0.6) of methylamine in methanol (which had been subjected to the dissolved oxygen-removing treatment and the filtering treatment with Fluoropore having a pore size of 0.1 μm) was added to the solution and the temperature of the charge in the reaction vessel was elevated to 230° C. A reaction was carried out under an inner pressure of 60 kg/cm$^2$·G for 3 hours. After termination of the reaction, the formed N-methylmethacrylimide-containing polymer was flashed into a tank maintained under a reduced pressure of 100 Torr from a nozzle opening, the flashed polymer was supplied onto a vented extruder screw having an L/D ratio of 20, and the polymer was shaped into a strand by the extruder. When the infrared absorption spectrum of the obtained polymer was measured, characteristic absorptions of the methacrylamide-containing polymer were observed at wave numbers of 1720 cm$^{-1}$, 1660 cm$^{-1}$ and 750 cm$^{-1}$.

The physical properties of the obtained polymer were as follows.

Total luminous transmittance: 93%
Heat distortion temperature: 145° C.
Degree of imidization: 80%
Number of particles in polymer: 13,500 per gram of polymer As apparent from the above data, a polymer having an excellent heat resistance and transparency, particularly one having a reduced number of fine particles and an excellent transparency, was obtained.

COMPARATIVE EXAMPLE 2

The procedures of Example 1 were repeated in the same manner except that the filtering treatment of the starting feed liquid and the methylamine solution with Fluoropore was omitted. The aging reaction after the imidization reaction was also omitted, and the reaction liquid coming from the reaction zone was flashed into a tank maintained under atmospheric pressure, from the nozzle orifice.

EXAMPLE 3

The procedures of Comparative Example 2 were repeated in the same manner except that the starting feed liquid and methylamine solution were filtered through Fluoropore having a pore size of 0.1 μm.

EXAMPLE 4

The procedures of Example 3 were repeated in the same manner except that the aging reaction was carried out at 230° C. in an aging reaction zone having an inner volume of 3 liters.

EXAMPLE 5

The procedures of Example 3 were repeated in the same manner except that the reaction liquid coming from the reaction zone was flashed into a tank maintained under a reduced pressure of 100 Torr, from the nozzle orifice.

The results of the analysis of the polymers obtained in Examples 1 through 5 and Comparative Examples 1 and 2 and the results of the evaluation of the properties of these polymers are shown in Table 1.

TABLE 1

| | Total luminous transmittance (%) | HDT (°C.) | Degree of imidization (mole %) | YI Value | Polymer amide content (%) | Monomer amide content (ppm) | Residual monomer content (ppm) | Number of particles per g of polymer | Molecular weight Mw | Attenuation (DB/KM) |
|---|---|---|---|---|---|---|---|---|---|---|
| Example 1 | 93 | 145 | 80 | | 1.5 | 300 | 200 | 12,000 | | 800 |
| Example 2 | 93 | 145 | 80 | | 2 | 400 | 100 | 13,500 | | |
| Comparative Example 1 | 89 | 145 | 80 | | 2 | 300 | 200 | 60,000 | | 1,800 |
| Example 3 | 89 | 145 | 80 | 4.0 | 7 | 1,800 | 700 | 13,000 | 85,000 | 1,300 |
| Example 4 | 90 | 145 | 80 | 2.8 | 1.3 | 1,800 | 700 | 12,000 | 85,000 | 1,100 |
| Example 5 | 90 | 145 | 80 | 3.0 | 7 | 350 | 150 | 12,000 | 85,000 | 1,000 |
| Comparative Example 2 | 88 | 145 | 80 | 4.2 | 7 | 1,800 | 700 | 100,000 | 85,000 | 2,600 |

We claim:

1. A methacrylimide-containing polymer, which is a thermoplastic polymer comprising 2 to 100% by weight of structural units represented by the following general formula (I):

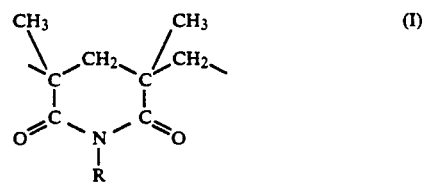

wherein R represents a hydrogen atom or an aliphatic, aromatic or alicyclic hydrocarbon group having 1 to 20 carbon atoms,
and 0 to 98% by weight of structural units derived from an ethylenically unsaturated monomer, wherein the number of fine particles having a size of 0.5 to 25 μm as measured by a particle counter in the polymer is not more than 50,000 per gram of the polymer.

2. A methacrylimide-containing polymer as set forth in claim 1, wherein the molecular weight (Mw) as measured by gel permeation chromatography (GPC) is 50,000 to 200,000.

3. A methacrylimide-containing polymer as set forth in claim 1, wherein the amount of amide segments in the polymer is not larger than 5% by weight.

4. A methacrylimide-containing polymer as set forth in claim 1, wherein the amount of amide derivatives as volatile components in the polymer is not larger than 1,000 ppm and the amount of a residual monomer as a volatile component in the polymer is not larger than 500 ppm.

5. A methacrylimide-containing polymer as set forth in claim 1, wherein the yellow index (YI) value as measured by a color difference meter is not larger than 3.

* * * * *